*(12)* United States Patent
Vance

(10) Patent No.: US 10,464,427 B2
(45) Date of Patent: Nov. 5, 2019

(54) SYSTEMS AND METHODS FOR BRAKING OR PROPELLING A ROAMING VEHICLE

(71) Applicant: Universal City Studios LLC, Universal City, CA (US)

(72) Inventor: Eric Vance, Ocoee, FL (US)

(73) Assignee: Universal City Studios LLC, Universal City, CA (US)

( * ) Notice: Subject to any disclaimer, the term of this patent is extended or adjusted under 35 U.S.C. 154(b) by 311 days.

(21) Appl. No.: 15/249,838

(22) Filed: Aug. 29, 2016

(65) Prior Publication Data

US 2018/0056792 A1     Mar. 1, 2018

(51) Int. Cl.
*B61L 3/22*     (2006.01)
*B61L 3/10*     (2006.01)
(Continued)

(52) U.S. Cl.
CPC ............ *B60L 9/16* (2013.01); *B60L 13/04* (2013.01); *B60L 15/005* (2013.01); *B60L 15/22* (2013.01); *B60L 15/28* (2013.01); *B61L 1/08* (2013.01); *B61L 3/10* (2013.01); *B61L 3/103* (2013.01); *B61L 3/121* (2013.01); *B61L 3/16* (2013.01);
(Continued)

(58) Field of Classification Search
CPC ........ B60L 13/04; B60L 15/005; B60L 15/22; B60L 15/28; B60L 2220/42; B60L 2240/10; B60L 2240/42; B60L 2240/622; B60L 9/16; B61L 1/08; B61L 3/10; B61L 3/103; B61L 3/121; B61L 3/16; B61L 3/22; B61L 3/225; G05D 1/0027; G05D 1/021; H02K 41/02
See application file for complete search history.

(56) References Cited

U.S. PATENT DOCUMENTS 3,768,607 A  * 10/1973   Marzocco ................ B61H 7/08
                                                       188/165
4,793,263 A     12/1988   Basic et al.
(Continued)

FOREIGN PATENT DOCUMENTS

CN           102968178 A      3/2013
EP            2295123 A1  *  3/2011  ............... A63G 7/00

OTHER PUBLICATIONS

PCT/US2017/048547 International Search Report and Written Opinion dated Jan. 5, 2018.

*Primary Examiner* — Charles J Han
(74) *Attorney, Agent, or Firm* — Fletcher Yoder, P.C.

(57) ABSTRACT

In one embodiment, a propulsion system includes roaming vehicles including a reaction plate installed on a bottom of each of the roaming vehicles, a surface stator matrix installed with a running surface for the roaming vehicles and including single sided linear induction motors (SSLIMs). Each of the SSLIMs include two windings installed orthogonally to one another. The propulsion system also includes motor drives configured to electrically couple to the SSLIMs via a switching panel, and a control system configured to receive information related to the roaming vehicles, receive a desired motion profile for the roaming vehicles across the surface stator matrix, determine which of the SSLIMs to activate and a performance of the SSLIMs based on the desired motion profile, the information, or some combination thereof, and send control signals to the motor drives to control the SSLIMs to produce the motion profile.

19 Claims, 11 Drawing Sheets

(51) Int. Cl.
  *B60L 15/20* (2006.01)
  *B61L 1/08* (2006.01)
  *B60L 15/00* (2006.01)
  *B60L 9/16* (2006.01)
  *G05D 1/00* (2006.01)
  *G05D 1/02* (2006.01)
  *B60L 13/04* (2006.01)
  *B60L 15/22* (2006.01)
  *B60L 15/28* (2006.01)
  *B61L 3/12* (2006.01)
  *B61L 3/16* (2006.01)

(52) U.S. Cl.
  CPC ............... *B61L 3/22* (2013.01); *B61L 3/225* (2013.01); *G05D 1/0027* (2013.01); *G05D 1/021* (2013.01); *B60L 2220/42* (2013.01); *B60L 2240/10* (2013.01); *B60L 2240/42* (2013.01); *B60L 2240/622* (2013.01); *Y02T 10/644* (2013.01); *Y02T 10/645* (2013.01); *Y02T 10/646* (2013.01); *Y02T 10/72* (2013.01); *Y02T 10/7275* (2013.01); *Y02T 10/7291* (2013.01); *Y02T 90/16* (2013.01); *Y02T 90/162* (2013.01)

(56) References Cited

U.S. PATENT DOCUMENTS

| | | | |
|---|---|---|---|
| 4,845,166 A * | 7/1989 | Sadhir | C08G 59/18 |
| | | | 528/109 |
| 6,445,093 B1 * | 9/2002 | Binnard | G03F 7/70716 |
| | | | 250/491.1 |
| 7,395,625 B2 | 7/2008 | Chladny | |
| 8,132,513 B2 | 3/2012 | Crawford et al. | |
| 8,327,979 B2 | 12/2012 | Lynch et al. | |
| 8,623,543 B2 | 1/2014 | Sastry et al. | |
| 8,757,345 B2 | 6/2014 | Blank et al. | |
| 9,061,214 B2 | 6/2015 | Hunter et al. | |
| 9,610,509 B2 | 4/2017 | Vance | |
| 2005/0024001 A1 * | 2/2005 | Donnelly | B60L 3/102 |
| | | | 318/66 |
| 2009/0320714 A1 | 12/2009 | Alberts | |
| 2012/0268235 A1 * | 10/2012 | Farhan | G05B 9/02 |
| | | | 340/3.1 |
| 2013/0300662 A1 | 11/2013 | Liu | |
| 2016/0038840 A1 * | 2/2016 | Vance | A63G 21/04 |
| | | | 104/53 |

* cited by examiner

SYSTEMS AND METHODS FOR BRAKING OR PROPELLING A ROAMING VEHICLE

BACKGROUND

The present disclosure relates generally to a motion control mechanism and, more particularly, to systems and methods for braking or propelling a roaming vehicle.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, vehicles include motors for driving the vehicles between locations. Motors are most often used to generate motive force, but certain types of motors can be used to both accelerate (e.g., start) and decelerate (e.g., stop) a vehicle. Indeed, there are a variety of motor arrangements used to accelerate and decelerate a vehicle carrying passengers. For example, trains, powered roller coasters, and the like, may utilize one or more electric motors with rotating elements to accelerate and decelerate a ride vehicle or car around a track. However, electric motors with rotating elements may be prone to mechanical issues and high downtime (e.g., the ride is inoperable) due to the rotating elements.

BRIEF DESCRIPTION

In accordance with an embodiment of the present disclosure, a propulsion system includes one or more roaming vehicles comprising a reaction plate installed on a bottom of each of the one or more roaming vehicles a surface stator matrix installed with a running surface for the one or more roaming vehicles and comprising a plurality of single sided linear induction motors (SSLIMs), wherein each of at least a portion of the plurality of SSLIMs include two windings installed orthogonally to one another; a plurality of motor drives configured to electrically couple to the plurality of SSLIMs via a switching panel; a control system configured to: receive information related to the one or more roaming vehicles; receive a desired motion profile for the one or more roaming vehicles across the surface stator matrix; determine which of the plurality of SSLIMs to activate and a performance of the plurality of SSLIMs based on the desired motion profile, the information, or some combination thereof; and send control signals to the plurality of motor drives to control the plurality of SSLIMs to produce the motion profile.

In accordance with another embodiment of the present disclosure, a method, includes receiving, via a control system, information related to one or more roaming vehicles disposed on a running surface of a surface stator matrix, wherein the surface stator matrix comprises a plurality of single sided linear induction motors (SSLIMs) each including two windings arranged orthogonal to each other and the one or more roaming vehicles comprise a non-ferrous reaction plate attached to a bottom of each respective roaming vehicle of the one or more roaming vehicles; receiving, via the control system, a desired motion profile for the one or more roaming vehicles across the surface stator matrix; determining, via the control system, a selection of the plurality of SSLIMs to activate and a performance of the plurality of SSLIMs based on the desired motion profile, the information, or some combination thereof; and sending, via the control system, control signals to the plurality of motor drives to control the selection of the plurality of SSLIMs to produce the motion profile.

In accordance with a further embodiment of the present disclosure, a propulsion system includes a control system that: receives information related to one or more roaming vehicles disposed on a running surface of a surface stator matrix, wherein the surface stator matrix comprises a plurality of single sided linear induction motors (SSLIMs) each including two windings arranged orthogonal to each other and the one or more roaming vehicles comprise a non-ferrous reaction plate attached to a bottom of each respective roaming vehicle of the one or more roaming vehicles; receives a desired motion profile for the one or more roaming vehicles across the surface stator matrix; determines which of the plurality of SSLIMs to activate and a performance of the plurality of SSLIMs based on the desired motion profile, the information, or some combination thereof; and sends control signals to the plurality of motor drives to control the plurality of SSLIMs to produce the motion profile.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
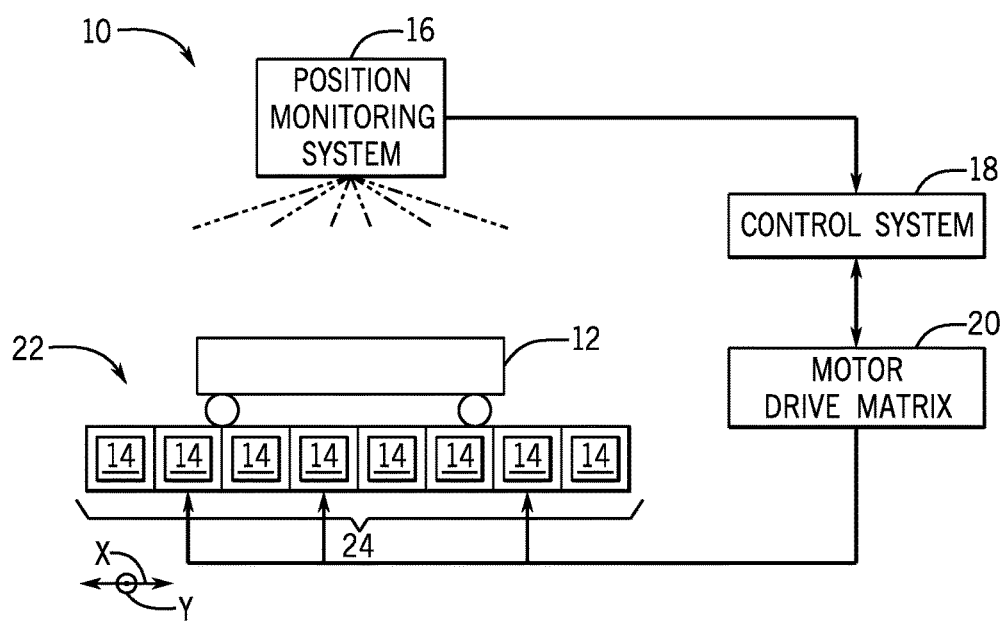
FIG. 1 is a schematic of a propulsion system for controlling the movement of roaming vehicles that includes single sided linear induction motors (SSLIMs), a position monitoring system, a control system, and a motor drive matrix, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In certain applications, such as an amusement park attraction, high uptime (e.g., the amusement park attraction is operational) is desirable to ensure that patrons are satisfied by being given the opportunity to ride or experience the amusement park attraction. However, some amusement park attractions use equipment to propel vehicles, such as rotary motors, that experience strong mechanical stresses in operation that may wear on certain parts of the equipment over time. For example, a shaft of a rotary motor or contact elements of the propulsion system, such as tires or tracks, may degrade after extended use. In addition, some roaming vehicles in attractions include onboard propulsion equipment (e.g., a motor and a power source for the motor) that may add weight to the vehicle, thereby affecting its performance. It is now recognized that it may be desirable to use equipment to propel vehicles in the attractions that are relatively low maintenance and/or located remote from the vehicle.

It is now recognized that it may be desirable to use electric motors without rotating elements, such as linear induction motors (LIMs) or linear synchronous motors (LSMs). The LIMs and/or LSMs may accelerate a ride vehicle or car along a track and bring the ride vehicle or car to rest at a desired location. Additionally, certain ride vehicles may be propelled around a course and stopped as desired using LIMs and/or LSMs. LIMs and/or LSMs generally include electric motors having stators and rotors in a linear configuration. Rather than producing torque with rotating elements, LIMs and LSMs produce the force to move the roaming vehicle by producing a linear magnetic field to attract or repel magnets or conductors in the field.

Some embodiments of the present disclosure generally relate to using a propulsion system that includes a running surface (e.g., floor) that includes single sided linear induction motors (SSLIMs), and a roaming vehicle that includes a reaction plate to interact with the SSLIMs. In some embodiments, the roaming vehicles may not include a power system to control the SSLIMs (e.g., the power system may be under the floor surface), thereby reducing the weight of the roaming vehicles. Further, the propulsion system may use relatively few moving parts by employing the SSLIMs to propel the roaming vehicle. Accordingly, one benefit enabled using the disclosed propulsion system is a reduction in maintenance and downtime as compared to other systems. In addition, using the SSLIMs to move the roaming vehicle may be highly dynamic in that a control system can control and adjust how each SSLIM is activated to move the roaming vehicle in any desired direction and path. Indeed, there may be numerous preconfigured roaming vehicle motion profiles (e.g., path, velocity) that are stored as instructions on one or more tangible, computer-readable mediums and executed by on one or more processors based at least on the arrangement of obstacles or show set on the running surface. If the obstacles or show set are changed (e.g., the ride is redesigned or themed for a special event), a preconfigured roaming vehicle motion profile may be implemented, the motion profile including instructions for which SSLIMs to activate and when to activate them based on the path and velocity of the roaming vehicle. Further, the roaming vehicle motion profile may be dynamically adjusted based on input from the patron occupying the roaming vehicle. Thus, another benefit of the disclosed embodiments may be rapid or real-time motion profile adjustment to provide users with different experiences during the ride or during subsequent rides.

With the foregoing in mind, FIG. 1 is a schematic of an embodiment of a propulsion system 10 for controlling the transportation of a roaming vehicle 12 that includes single sided linear induction motors (SSLIMs) 14, a position monitoring system 16, a control system 18, and a motor drive matrix 20, in accordance with an embodiment. Although just one roaming vehicle 12 is depicted, it should be understood that the propulsion system 10 may be used to control the transportation of numerous roaming vehicles 12 (e.g., between 1 and 10). As depicted, the roaming vehicle 12 is disposed on a two-dimensional (e.g., including x- and y-axes) running surface 22 (e.g., a floor) that includes a matrix 24 of installed SSLIMs 14. The matrix 24 may be referred to as the surface stator matrix 24 herein. The SSLIMs 14 may be constructed as tile blocks for the running surface 22, as described in detail below. Each roaming vehicle 12 may be considered an automated guided vehicle (AGV) and may include a reaction plate and a backing plate (e.g., steel) secured to a bottom of the roaming vehicle 12. As described below, the reaction plate may include a non-ferrous conductor (e.g., aluminum, copper, zinc, amalgam of brass and copper). The SSLIMs 14 may each represent a stator and the reaction plate and the steel backing plate of the roaming vehicle 12 may represent a rotor, when the SSLIMs 14 and the reaction plate interact to produce motion of the roaming vehicle 12. As described in detail below, the surface stator matrix 24 may be controlled using the position monitoring system 16, the control system 18, and the motor drive matrix 20.

Although the following discussion focuses on SSLIMs 14 being used in the propulsion system 10, it should be noted that, in some embodiments a linear synchronous motor (LSM) including a rare earth magnet may be used. In such embodiments, the stator may include an electromagnetic motor winding on one side of an air gap and the rotor may include one or more permanent magnets on the other side of the air gap. For example, the stator in the LSM may be located in the running surface and the rotor may be located on the bottom of the roaming vehicle 12, or vice versa.

Returning to the depicted embodiment including the SSLIMs 14, the number and size of the SSLIMs 14 included in the surface stator matrix 24 disposed in the running surface 22 may be influenced by one or more factors. For example, the SSLIMs 14 to reaction plate ratio may influence motion performance (e.g., speed and direction of movement) of the roaming vehicle 12. A greater number of SSLIMs 14 interacting with a reaction plate may result in finer steering motion control with diminished acceleration. In contrast, a smaller number of SSLIMs 14 per reaction plate may result in higher acceleration and gross motion control. The density of SSLIMs 14 in the running surface 22 may be determined based on desired performance of the roaming vehicle 12. Additionally, some SSLIMs 14 may be different sizes (e.g., larger) than other SSLIMs 14. In some embodiments, various portions of the running surface 22 may include different densities of SSLIMs 14 than other portions based on the desired performance. When the SSLIMs 14 are placed in the surface stator matrix 24, the SSLIMs 14 may be activated to control the motion of the roaming vehicle 12.

Figure 2:
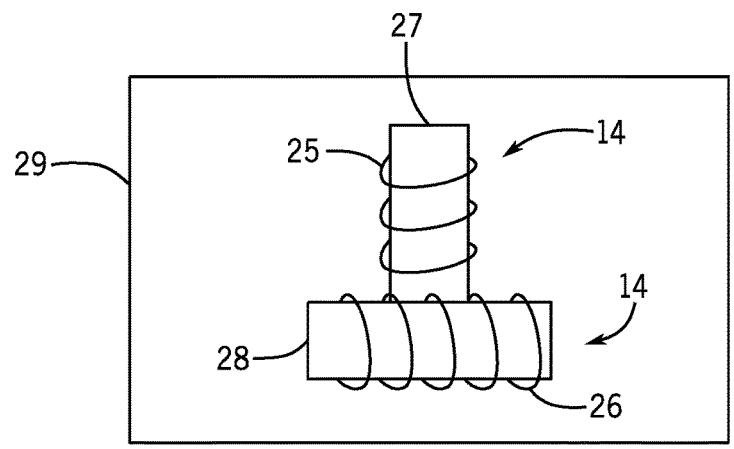
FIG. 2 is an overhead view of a SSLIM from FIG. 1, in accordance with an embodiment of the present disclosure.

In some embodiments, the SSLIMs 14 may be bi-directional because each SSLIM 14 may include windings 25 and 26 that are arranged or installed orthogonally to each other, as depicted in the overhead view of the SSLIM 14 in FIG. 2. The windings 25 and 26 may each be wound around a respective layered steel laminate 27 and 28 adhered together to form the SSLIMs 14. The SSLIMs 14 may be placed in a slat and encased in an epoxy to create tile blocks 29 (e.g., plastic resin block). The tile blocks 29 including the SSLIMs 14 may be installed in a grid pattern to form the running surface 22.

To propel the roaming vehicle 12 around the running surface 22, an electric current may be applied to the appropriate windings 25 and 26 of the SSLIMs 14 to thrust the roaming vehicle 12 in a desired direction. The windings 25 and 26 may generate a magnetic field when current is applied that may cause the non-ferrous conductor included in the reaction plate to produce an opposing magnetic field (e.g., eddy currents). The opposing magnetic fields may repel each other and cause the reaction plate to move, thereby moving the respective roaming vehicle 12. The amount of acceleration of the roaming vehicle 12 may be proportional to the sum magnetic field produced by the SSLIMs 14. The sum magnetic field may be controlled by the amount of electric current supplied to the windings 25 and 26 of the SSLIMs 14.

One winding 25 may provide a first motive force in a first direction and another winding 26 may provide a second motive force in a second direction, depending on how the SSLIM 14 is arranged in the surface stator matrix 24. For example, the first direction may be longitudinal and the second direction may be lateral. In a more specific example, the second direction may be crosswise relative to the first direction, such as 90 degrees from and coplanar with the first direction. In addition, each winding 25 and 26 can provide a forward and a backward direction of thrust by reversing the polarity of the magnetic field produced by the winding 25 and 26. Thus, using orthogonally arranged windings 25 and 26, each of the SSLIMs 14 may provide four directions of thrust as desired. As a result, the SSLIMs 14 may be controlled in coordination to thrust the roaming vehicle 12 in any direction and/or stop the roaming vehicle 12 on the running surface 22 as desired. That is, various combinations of SSLIMs 14 may be activated to produce a force vector in any desired direction to move the roaming vehicle 12. In some embodiments, the SSLIMs 14 may include one winding and may be positioned orthogonal to another SSLIM 14 that includes one winding.

It should be noted that the motor drive matrix 20 may control the strength of the magnetic field generated by the windings 25 and 26, in addition to the polarity, by adjusting the current supplied to the windings 25 and 26. That is, an increase in current may cause a stronger magnetic field to be emitted that increases acceleration of the roaming vehicle 12 when the reaction plate of the roaming vehicle 12 passes through the magnetic field. Thus, the magnitude and the direction of the magnetic field may be adjusted to control the speed and direction of movement of the roaming vehicle 12 as its reaction plate reacts with the magnetic field generated by the SSLIMs 14.

Returning to FIG. 1, there may be numerous (e.g., between 2 and 20) SSLIMs 14 located underneath the reaction plate at any given position of the roaming vehicle 12 on the running surface 22. To move the roaming vehicle 12 in a given direction and at a certain speed, a combination of the SSLIMs 14 underneath the reaction plate may be turned on and off in time to react with the reaction plate of the roaming vehicle 12 as the roaming vehicle 12 traverses the running surface 22. For example, to move the roaming vehicle 12 forward, one or more SSLIMs 14 located underneath a left and right side of the reaction plate may be turned on to provide thrust in a forward direction. At the same time, if it is desired to cause the roaming vehicle 12 to spin, a SSLIM 14 located underneath the front and the back of the reaction plate may be turned on in a direction orthogonal to the forward direction of travel. That is, the SSLIM 14 in the front may cause thrust left and the SSLIM 14 in the back cause thrust right so the roaming vehicle 12 spins as it moves forward. Applying current to SSLIMs 14 in a more complex pattern may, for example, result in curved motion of the roaming vehicle 12 as it translates across the running surface 22. Such scenarios and numerous other roaming vehicle 12 motion examples are described below.

The position of the roaming vehicles 12 may be observed by the position monitoring system 16. The position monitoring system 16 may determine vehicle information related to the position and the velocity of the roaming vehicle 12 and send the vehicle information to the control system 18. The control system 18 may determine which SSLIMs 14 to power and when to power them based at least on the vehicle information and the desired motion profile of the roaming vehicle 12. Then, the control system 18 may send control signals to the motor drive matrix 20 to drive the SSLIMs 14 accordingly to propel the roaming vehicle 12.

As previously noted, the disclosed embodiments may enable changes to the motion profile of the roaming vehicles 12, either dynamically (e.g., on the fly) or statically (e.g., in a pre-configuration stage). For example, a patron may use a wireless directional controller to steer the roaming vehicle 12 and the SSLIMs 14 may be controlled accordingly to thrust the roaming vehicle 12 in the desired direction. Further, the control system 18 may store a number of preconfigured roaming vehicle motion profiles that steer the roaming vehicle 12 around stationary obstacles on the running surface 22. The preconfigured roaming vehicle motion profiles may identify which SSLIMs 14 to activate and when to activate them based on the path and velocity of the roaming vehicle 12. When the obstacles on the running surface 22 are rearranged (e.g., a ride is redesigned), a new roaming vehicle motion profile may be preconfigured and executed by the control system 18. Thus, some embodiments of the present disclosure may provide a patron with a different experience during each ride.

Figure 3:
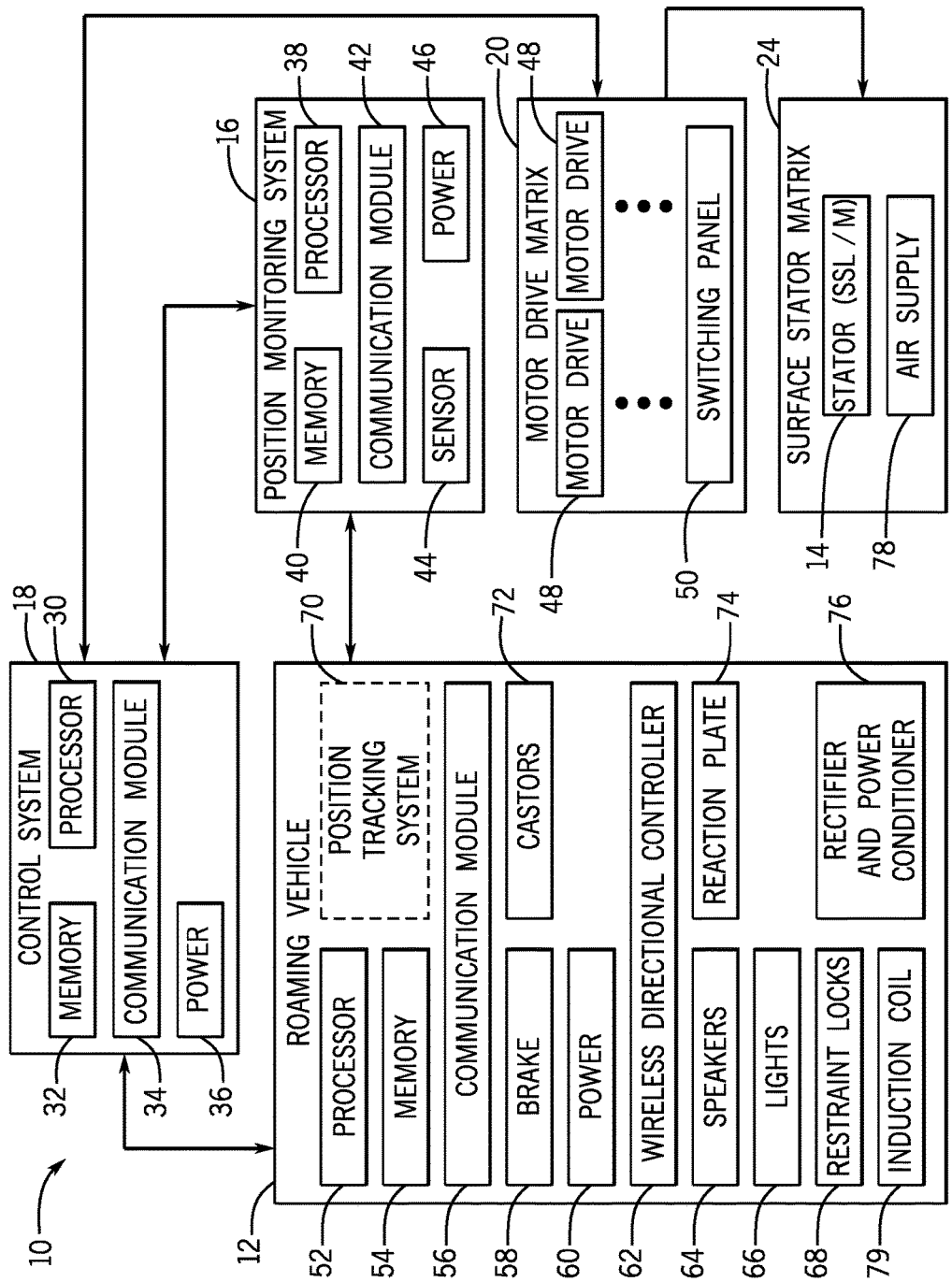
FIG. 3 is a block diagram of example components of the propulsion system of FIG. 1, in accordance with an embodiment of the present disclosure.

The propulsion system 10 may include various components that enable the embodiments discussed above. For example, FIG. 3 is a block diagram of example components of the propulsion system 10. The propulsion system 10 may include the surface stator matrix 24, one or more roaming vehicles 12, the control system 18, the position monitoring system 16, and the motor drive matrix 20. As previously discussed, the propulsion system 10 may be configured to control the transportation of the roaming vehicle 12 across the running surface 22 where the surface stator matrix 24 is installed. The control system 18, the position monitoring system 16, the motor drive matrix 20, the roaming vehicle 12, and the surface stator matrix 24 may include various components that enable controlled movement of the roaming vehicle 12.

The control system 18 may include a processor 30, a memory 32, a communication module 34, and a power supply 36. The processor 30, which may represent one or more processors, may be any type of computer processor or microprocessor capable of executing computer-executable code. The memory 32, which may represent one or more memory components, may be any suitable articles of manufacture that can serve as media to store processor-executable code, data, or the like. These articles of manufacture may represent tangible, non-transitory computer-readable media (e.g., any suitable form of tangible memory or storage) that may store the processor-executable code used by the processor 30 to control aspects of the presently disclosed embodiments, such as determining which SSLIMs 14 to activate and the magnitude and direction of their magnetic fields. The memory 32 may also be used to store the vehicle information received from the position monitoring system 16.

The communication module 34 may be a wireless or wired communication component that may facilitate communication with the position monitoring system 16, the roaming vehicle 12, and the motor drive matrix 20. As such, the communication module 34 may include a wireless card or data port (e.g., Ethernet connection) capable of transmitting and receiving data. For example, after making the determinations of which SSLIMs 14 to activate and performance (magnitude and direction of the magnetic fields) of the SSLIMs 14, the processor 30 may instruct the communication module 34 to send command instructions (e.g., SSLIM 14 identifier, activation/deactivation timing, force direction, amount of force to apply) to the motor drive matrix 20, which may supply electric current to the SSLIMs 14 accordingly. The power supply 36 may be any suitable power supply, including, but not limited to, a battery, for the control system 18.

The position monitoring system 16 may include a processor 38, a memory 40, a communication module 42, and a sensor 44. It should be noted that although the position monitoring system 16 is depicted as a separate component from the control system 18, in some embodiments, the position monitoring system 16 may be included in the control system 18. The processor 38, which may represent one or more processors, may be any type of computer processor or microprocessor capable of executing computer-executable code. The memory 40, which may represent one or more memory components, may be any suitable articles of manufacture that can serve as media to store processor-executable code, data, or the like. These articles of manufacture may represent tangible, non-transitory computer-readable media (e.g., any suitable form of tangible memory or storage) that may store the processor-executable code used by the processor 38 to acquire vehicle information about the roaming vehicle 12, such as position and velocity of the roaming vehicle 12, and transmit the vehicle information to the control system 18, among other things. The memory 40 may also be used to store the vehicle information acquired by the sensor 44.

The communication module 42 may be a wireless or wired communication component that may facilitate communication with the control system 18 and/or the roaming vehicle 12. As such, the communication module 42 may include a wireless card or data port (e.g., Ethernet connection) capable of transmitting and receiving data. The sensor 44 may include an optic system that utilizes a camera to enable the position monitoring system 16 to track certain vehicle information (e.g., position of roaming vehicle 12 and/or velocity of roaming vehicle 12). In some embodiments, the processor 38 and the communication module 42 may use signal (e.g., radio) triangulation to triangulate a signal emitted from the roaming vehicle 12 through a network to which the position monitoring system 16 and the roaming vehicle 12 are connected. Once triangulated, the processor 38 may determine the location of the roaming vehicle 12 on the surface stator matrix 24. The vehicle information obtained by the position monitoring system 16 may be sent to the control system 18, which in turn determines which SSLIMs 14 to activate/deactivate and/or the performance (direction and strength of the magnetic fields) of the SSLIMs 14. The power supply 46 may be any suitable power supply, including, but not limited to, a battery, for the position monitoring system 16.

The motor drive matrix 20 may include a plurality of motor drives 48. The motor drives 48 may include variable frequency drives (VFDs) that may control the strength and direction of the magnetic field (e.g., corresponding to the direction and amount of thrust generated by the SSLIMs 14) by varying input frequency and voltage to the windings of the SSLIMs 14. The number of motor drives 48 may be less than the total number of SSLIMs 14 included in the surface stator matrix 24. That is, in some embodiments, there may not be a one-to-one relationship between the number of motor drives 48 and SSLIMs 14 because only the SSLIMs 14 used in the roaming vehicle motion profile may be activated at any given time.

To enable using less motor drives 48 than SSLIMs 14, the processor 30 of the control system 18 may multiplex the motor drives 48 to control only those SSLIMs 14 that are in a preconfigured roaming vehicle motion profile or are dynamically determined to be in the motion profile based on input from the user. When determining which motor drives 48 to multiplex, in one embodiment, the processor 30 considers the number of total windings of the SSLIMs 14 needed to motivate the roaming vehicle 12 based on factors such as static friction, rolling friction, inertia, maximum acceleration and velocity, and/or braking acceleration. The control system 18 may send control signals to a switching panel 50 (e.g., solid state switching panel) of the motor drive matrix 20 to control the motor drives 48 to drive the appropriate SSLIMs 14 at a particular time and continuously switch the control of the next SSLIMs 14 in the vehicle motion profile to available motor drives 48 to move the roaming vehicle 12 around the surface stator matrix 24 based on where the roaming vehicle 12 is located. Thus, in some embodiments, the number of motor drives 48 used may be less than the number of SSLIMs 14. In one embodiment, windings 25 and 26 of the SSLIMs 14 are wired directly to the switching panel 50 that switches the control of the SSLIMs 14 between motor drives 48 and/or directly to the motor drives 48. In this way, the motor drives 48 may be electrically coupled to the SSLIMs 14. Maintainability may be increased by the multiplexing scheme described above that may reduce the overall hardware count (e.g., number of drives) of the propulsion system 10. However, in some embodiments, the same number of motor drives 48 and SSLIMs 14 may be used.

Regarding the roaming vehicle 12, its components may include a processor 52, a memory 54, a communication module 56, a mechanical brake 58, a power supply 60, a wireless directional controller 62, speakers 64, lights 66, a restraint lock 68, a position tracking system 70, casters 72, a reaction plate (e.g., rotor) 74, a rectifier and power conditioner 76, and/or an induction coil 79. The processor 52, which may represent one or more processors, may be any type of computer processor or microprocessor capable of executing computer-executable code. The memory 54, which may represent one or more memory components, may be any suitable articles of manufacture that can serve as media to store processor-executable code, data, or the like. These articles of manufacture may represent tangible, non-transitory computer-readable media (e.g., any suitable form of tangible memory or storage) that may store the processor-executable code used by the processor 52 to perform the presently disclosed techniques, such as controlling the onboard electronics (communication module 56, wireless directional controller 62, position tracking system 70, speakers 64, lights 66, restraint locks 68, etc.) and/or brake 58. In some embodiments, the memory 54 may also be used to store the vehicle's information such as size dimensions (e.g., weight, length, width, height), velocity, acceleration, and so forth.

The communication module 56 may be a wireless communication component that may facilitate communication with the control system 18 and/or the position monitoring system 16. As such, the communication module 56 may include a wireless card capable of transmitting and receiving data. For example, the processor 52 may instruct the communication module 56 to send the vehicle information to the control system 18 so the control system 18 can determine which SSLIMs 14 to activate and how the SSLIMs 14 should be activated.

To enable movement of the roaming vehicle 12, the roaming vehicle 12 includes the reaction plate 74, casters 72, and the mechanical brake 58. The movements of the roaming vehicle 12 may include accelerating, decelerating, turning, and stopping of the roaming vehicle 12. The reaction plate 74 may include a reaction plate including a non-ferrous conductor plate and a ferrous (e.g., steel) backing plate. In an embodiment, the reaction plate is a single continuous or monolithic non-ferrous plate attached or installed on to the bottom of the roaming vehicle 12. In such embodiments, the reaction plate may encompass as much of the bottom area (or possibly larger) of the roaming vehicle 12 to provide sufficient surface area for interaction with the magnetic fields generated by the SSLIMs 14. Different types of non-ferrous material may provide better efficiency than others due to conductivity, electric flow, magnetic field flow, and the like. The shape of the reaction plate may be any suitable shape, including circular, rectangular, square, or the like. The casters 72 may include any suitable rolling equipment, such as wheels, that enables multi-directional and unlimited orientation on the running surface 22. In some embodiments, the casters 72 may be used to maintain an air gap between the stator 14 and the reaction plate 74, which increases efficiency of propulsion using the SSLIMs 14 by mitigating energy losses due to friction. In some embodiments, as described further below, the mechanical brake 58 may include a ferrous plate and a braking material on the ferrous plate. The ferrous plate is attracted to the magnetic field generated by the SSLIMs 14 underneath the reaction plate, which pulls the brake 58 down to contact the running surface 22. The braking material provides friction between the brake 58 and the running surface 22 to slow or stop the roaming vehicle 12.

As discussed above, the roaming vehicle 12 may not include a power system that is used to supply power to a motor (SSLIM 14). As such, the roaming vehicle 12 may be lighter than other roaming vehicles 12 that include a power system. However, in some embodiments, the roaming vehicle 12 may include a power supply 60 that is charged using energy obtained by the induction coil 79 on the reaction plate 74 from the magnetic field of the SSLIMs 14. In some embodiments, the energy inducted may be rectified and conditioned by the rectifier and power conditioner 76 and used to power onboard electronics, such as the processor 52, the memory 54, the communication module 56, wireless directional controller 62, the speakers 64, the lights 66, the position tracking system 70, and/or restraint locks 68.

The speakers 64 and/or the lights 66 may be controlled by the processor 52 during certain parts of the ride to enhance the theme of the ride or enhance show elements in the roaming vehicle 12. Further, the user may use the wireless directional controller 62 to guide the roaming vehicle 12 around the surface stator matrix 24. For example, the desired direction may be transmitted to the control system 18, which may determine which SSLIMs 14 to activate to thrust the roaming vehicle 12 in the desired direction based on the user input. In some embodiments, the wireless directional controller 62 may be limited to enable the user to spin the roaming vehicle 12 but not actually control the gross movement direction of the roaming vehicle 12, or vice-versa. For example, the user may spin the roaming vehicle 12 during a ride to look at a different scene or shoot at a target but the roaming vehicle 12 is still transported along a set path. The restraint locks 68 may be used to restrain the patrons in the roaming vehicle 12 (e.g., while the roaming vehicle 12 is in motion and/or stationary).

The position tracking system 70 may monitor the position of the roaming vehicle 12 on the surface stator matrix 24. In one embodiment, the position tracking system 70 interacts with sensors on the surface stator matrix 24. Each sensor represents a unique location (e.g., coordinates relative to one or more reference points) on the surface stator matrix 24. In such an embodiment, the position tracking system 70 includes a reader that may read the sensors to determine the position of the roaming vehicle 12 on the surface stator matrix 24. The reader may then supply the position information to the control system 18, which in turn determines which SSLIMs 14 to activate and how each should be activated. In some embodiments, the position tracking system 70 may include RFID tags and/or emitted lasers to provide and/or acquire position information. In embodiments where the position monitoring system 16 tracks the vehicle information utilizing the sensor 44, the roaming vehicles 12 may not include the position tracking system 70. While FIG. 3 illustrates the tracking system 70 on the roaming vehicle 12, in other embodiments it is not present, which is indicated by the dashed lines. In accordance with some embodiments, the determination of vehicle position is performed completely wayside. As an example, wayside determinations may be based on machine vision systems positioned above the roaming vehicle 12 and configured to monitor location or positioning thereof. Further, in some embodiments, the only power and control onboard the roaming vehicle 12 is that associated with entertainment (e.g. lighting and audio effects). The braking in such embodiments may be passively controlled and passenger restraints may be mechanically actuated. However, in other embodiments the passenger restraints may be electrically actuated through induction pickups. In such embodiments, keeping navigation and other ride control wayside (off the roaming vehicle 12) provides for efficient vehicle design and algorithmic control off board. Additionally or alternatively, the position tracking system 70 of the roaming vehicle 12 and the position monitoring system 16 may work in concert to acquire vehicle information (e.g., position and/or velocity) to send to the control system 18.

In some embodiments, the surface stator matrix 24 may include the SSLIMs (stators) 14 and an air supply 78. As previously discussed, the SSLIMs 14 may be included in tile blocks 29. The tile blocks 29 may be arranged on a grid of the matrix 24 based on the desired performance of portions of the surface stator matrix 24 (e.g., larger SSLIMs 14 may be placed in portions where high acceleration and deceleration are desired). The tile blocks 29 may be readily removable from the surface stator matrix 24 to enable servicing or replacement.

Vinyl (e.g., linoleum) may be placed over each one of the tile blocks and may be used as a wear surface. For example, one or more sheets of vinyl may be used to cover the tile blocks. The vinyl covering the tile blocks may serve as the running surface for the roaming vehicles 12. In some embodiments, there may be a certain amount of distance between the tile blocks 29 (e.g., between 0.1 centimeter and 0.5 centimeter). Maintaining a small air gap (e.g., within a certain threshold distance) between the stator and the rotor in linear induction motors may greatly enhance generation of a thrust vector and may increase efficiency of the motor. Thus, the vinyl or cover applied to the tile blocks 29 should be relatively thin and non-metallic.

In some embodiments, the architecture of the surface stator matrix 24 may enable a robust backup capability. For example, when a relatively small number of SSLIMs 14 do not operate as desired, the control system 18 may control an adjacent SSLIM 14 to produce the desired magnetic field. In some scenarios, the adjacent SSLIM 14 may be located underneath the reaction plate 74 or near the reaction plate 74 and may produce an induction field that motivates the reaction plate 74. However, in some embodiments, off tangent force vectoring may cause the use of the adjacent SSLIMs 14 to result in a less efficient motivating force. This may be compensated for in such scenarios by closed-loop feedback that modulates the drive time and/or current to all applicable SSLIMs 14 resulting in the planned motion profile and desired thrust vector as the roaming vehicle 12 traverses the surface stator matrix 24. The control system 18 may use the closed-loop feedback to detect the loss of certain windings of the SSLIMs 14 through back calculation of the resultant roaming vehicle 12 motion.

In some embodiments, when casters 72 are not used, the air supply 78 may be used to blow air through holes in the running surface 22 and float the roaming vehicle 12 on an air bearing. In this embodiment, there are no contact points between the roaming vehicle 12 and the running surface 22, and the SSLIMs 14 are controlling the position and rotation of the roaming vehicle 12. Such an embodiment may increase uptime (e.g., the attraction is operational) of the attraction because there are fewer components to maintain (e.g., tires, bearings, and wheels).

Figure 4:
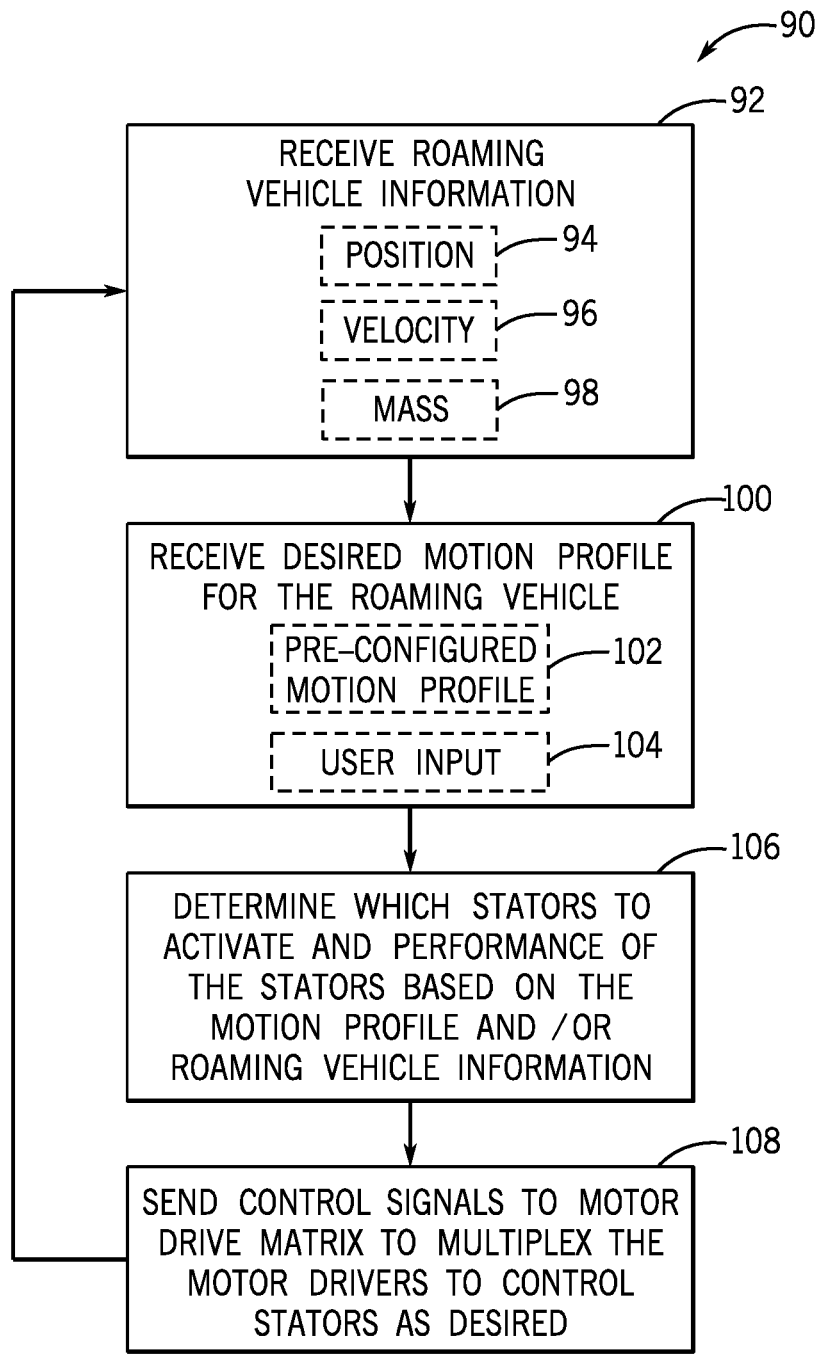
FIG. 4 is a flow diagram of a process for controlling the movement of one or more roaming vehicles using the propulsion system of FIG. 1, in accordance with an embodiment of the present disclosure.

Turning now to operation of the propulsion system 10, an embodiment of a process 90 for controlling the transportation of one or more roaming vehicles 12 using the propulsion system 10 is illustrated by the flow diagram in FIG. 4. Although the following description of the process 90 is described as being performed by the control system 18, it should be noted that some or all of the process 90 may be performed by other control devices that may be capable of communicating with the control system 18, the position monitoring system 16, and/or the motor drive matrix 20, such as a computing device or other component associated with the propulsion system 10. Additionally, although the following process 90 describes a number of operations that may be performed, it should be noted that the process 90 may be performed in different orders and that certain operations may not be performed. The process 90 may be implemented as computer instructions stored on the memory 32 of the control system 18.

In the illustrated embodiment of the process 90, the control system 18 may receive (block 92) roaming vehicle information. The roaming vehicle information may be received from the position monitoring system 16 and/or the roaming vehicle 12 and may include information for one or more roaming vehicles 12 disposed on the running surface 22. The roaming vehicle information may include a position (data 94) of the roaming vehicle 12 on the running surface 22, a velocity (data 96) of the roaming vehicle 12, and/or a mass (data 98) of the roaming vehicle 12.

The control system 18 may receive (block 100) the desired motion profile (e.g., path, velocity) for the roaming vehicle 12. In some embodiments, the desired motion profile may be preconfigured (data 102) that includes the path for the roaming vehicle 12 and/or the desired velocities of the vehicle 12 at each portion of the surface stator matrix 24. In such an embodiment, the preconfigured motion profile may be obtained from the memory 32. Additionally or alternatively, the desired motion profile may include directions based on user input (data 104). As previously discussed, the user input may enable the user to rotate the roaming vehicle 12 while the preconfigured path of the roaming vehicle 12 is still followed, the user input may enable the user to actually control the direction where the roaming vehicle 12 travels, the user input may enable the user to increase acceleration or deceleration of the roaming vehicle 12, or some combination thereof.

The control system 18 may determine (block 106) which SSLIMs 14 to activate and performance of the SSLIMs (e.g., activation timing, amount of thrust) based at least on the desired motion profile and/or the roaming vehicle information. For example, in some embodiments at the beginning of a ride, the control system 18 may already know the position of the roaming vehicle 12 and may only use the motion profile to determine which SSLIMs 14 to activate, the times at which to activate each SSLIM 14, and the amount of thrust to generate as the roaming vehicle 12 traverses the surface stator matrix 24. However, in some embodiments, where the motion profile dynamically changes (e.g., based on user input), the control system 18 may use the position 94 of the roaming vehicle 12 to determine which SSLIMs 14 are underneath or nearby the roaming vehicle 12 and select to activate those SSLIMs 14 as the roaming vehicle 12 traverses the surface stator matrix 24 (e.g., while deactivating SSLIMs 14 that are not selected). In some embodiments, a certain percentage of SSLIMs 14 around the roaming vehicle 12 may be activated to improve efficiency.

Further, in some embodiments, determining the number of SSLIMs 14 to activate may depend on the velocity 96 of the roaming vehicle 12. For example, when first starting the roaming vehicle 12 in motion, it may be desirable to activate all SSLIMs 14 underneath the reaction plate to generate higher power and acceleration. When the roaming vehicle 12 reaches a desired velocity, the control system 18 may reduce the density of SSLIMs 14 that are active in the particular direction because fewer SSLIMs 14 may maintain a certain amount of energy to maintain the desired velocity. When the motion profile indicates a change of direction for the path of the roaming vehicle 12, then the magnitude of the thrust vector and density of SSLIMs 14 used may be increased because changing direction may require more torque than proceeding in a straight line. Thus, the density of SSLIMs 14 that are selected to activate under the roaming vehicle 12 at any one time may depend on the torque demand and current motion vector of the roaming vehicle 12.

It should be understood that the orthogonally arranged windings 25 and 26 of each SSLIM 14 may enable multi-directional movement of the roaming vehicle 12 to follow any motion profile. Each winding 25 and 26 may be individually energized. The force vector generated may be configured as desired because one winding 25 may provide a field in a first direction (e.g., forward or backward) and a second winding 26 may provide a field in a second direction (e.g., right or left). Used in combination, the windings 25 and 26 of the SSLIMs 14 may be activated to provide a force vector at any angle.

The control system 18 may send (block 108) control signals to the motor drive matrix 20 to multiplex the motor drives 48 to control the SSLIMs 14 as desired. In some embodiments, the switching panel 50 may be used to connect the motor drives 48 to the appropriate SSLIMs 14. The control system 18 may return to receiving roaming vehicle information at block 92 and repeat the process 90 to continuously navigate the roaming vehicle 12 around the running surface 22.

Figure 5:
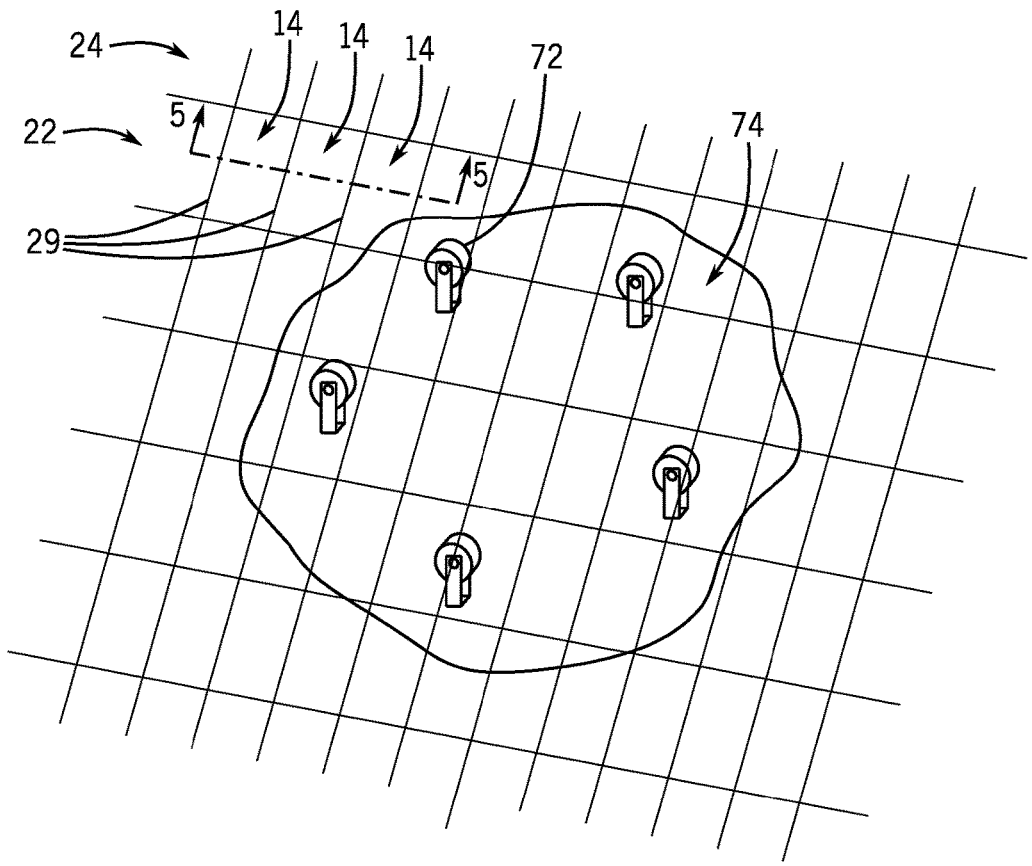
FIG. 5 is an overhead schematic of a roaming vehicle having a reaction plate located above a surface stator matrix, in accordance with an embodiment of the present disclosure.

To aid in visualizing the interaction between the reaction plate 74 of the roaming vehicle 12 and the surface stator matrix 24 under the running surface 22, FIG. 5 illustrates an overhead schematic of the reaction plate 74 located above the surface stator matrix 24. As previously discussed, the reaction plate 74 may be formed from any suitable non-ferrous conductive material, such as aluminum, copper, zinc, amalgam of brass and copper, or the like. Further, a ferrous (e.g., steel) backing plate may be disposed between the reaction plate 74 and the bottom of the roaming vehicle 12. As the magnetic field passes through the conductor of the reaction plate 74, the steel backing plate may return the field back to the SSLIM 14. The force vector may be generated by the opposing magnetic field of the conductor that is induced by eddy currents as the magnetic field of the SSLIM 14 passes through the conductor.

As depicted, one or more casters 72 (e.g., 5) may be attached to the base of the roaming vehicle 12. The casters 72 may include wheels that are used to roll the roaming vehicle 12 around the running surface 22. The casters 72 may be used to maintain a precise air gap between the reaction plate 74 and the surface stator matrix 24 to maintain an efficient induction field.

Figure 6:
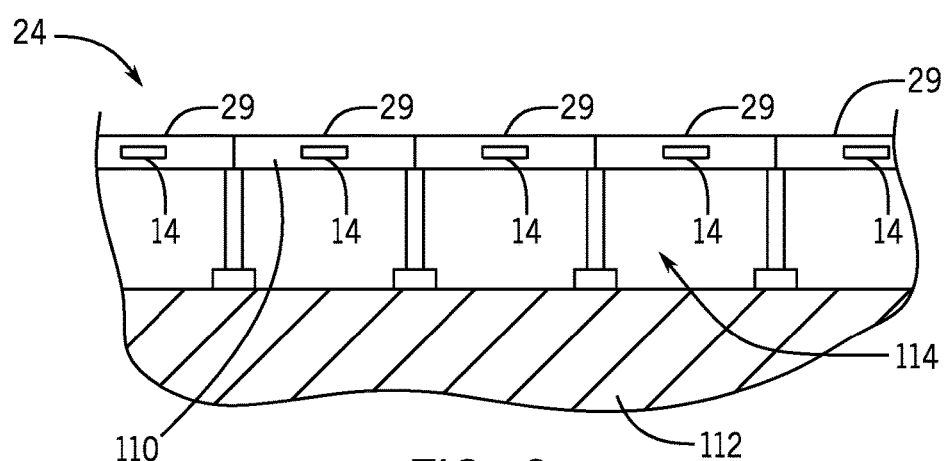
FIG. 6 is a cross-sectional view of the surface stator matrix taken along section 5-5 of FIG. 5, in accordance with an embodiment of the present disclosure.
Figure 7:
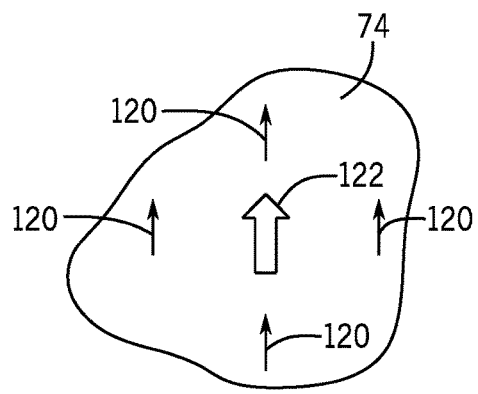
FIGS. 7-15 are overhead schematics illustrating the manner in which the magnetic field produced by a series of SSLIMs can be controlled to interact with a reaction plate of a roaming vehicle to produce different thrust vectors, in accordance with an embodiment of the present disclosure.

As previously discussed, the SSLIMs 14 of the surface stator matrix 24 may be included in tile blocks 29 and arranged in a grid pattern. In some embodiments, the sub-floor support 110 may be used to elevate the surface stator matrix 24 off of a foundation 112 and provide room for wiring space 114, as illustrated in the cross-sectional view in FIG. 6. The sub-floor support 110 may support a grid on which each of the tile blocks 29 including SSLIMs 14 is placed. The wiring of the SSLIMs 14 may be disposed in the wiring space 114 and may connect the SSLIMs 14 to the motor drives 48 and/or the switching panel 50. The tile blocks 29 (e.g., epoxy blocks) may generally be square shaped, rectangular shaped, circular shaped, or the like as described above and may include two orthogonally arranged windings 25 and 26 of the SSLIMs 14.

FIGS. 7-15 generally illustrate examples of how various SSLIMs 14 located underneath or near the reaction plate 74 may be controlled to provide different thrust vectors and move the roaming vehicle 12 in desired directions. It should be noted that the number of SSLIMs 14 applied in the same direction increases the thrust in that direction. Further, pulsing of the SSLIMs 14 may facilitate certain motions. The processor 30 may determine the number of SSLIMs 14 to apply using physics modeling to change the thrust vector. Also, if a thrust vector is provided in one direction, an equal and opposite thrust may be provided to change the vector. Starting with FIG. 7, an overhead schematic illustrates SSLIMs 14 being controlled to produce a thrust vector in a forward direction in the reaction plate 74, in accordance with an embodiment. As indicated by arrows 120, one or more SSLIMs 14 underneath the front, back, left side, and right side of the reaction plate 74 are providing a thrust in a forward direction. As a result of the combined thrusts, the thrust vector is in a forward direction as indicated by arrow 122.

Figure 8:
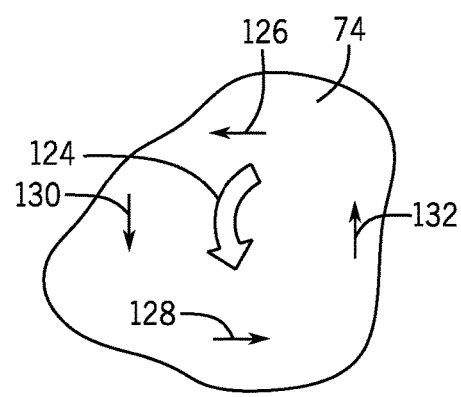

FIG. 8 is an overhead schematic illustrating SSLIMs 14 being controlled to produce a counter-clockwise thrust vector (indicated by arrow 124) in the reaction plate 74, in accordance with an embodiment. The counter-clockwise thrust vector 124 may spin the roaming vehicle 12. To produce the counter-clockwise thrust vector 124, one or more SSLIMs 14 underneath the front and back of the reaction plate 74 may provide a thrust orthogonal (90 degrees to the left and right) (arrow 126 and 128) to the thrusts (arrows 130 and 132) produced by one or more SSLIMs 14 underneath the sides of the reaction plate 74. As depicted, the thrust 128 produced in the left side of the reaction plate 74 is in a backward direction and the thrust 130 produced in the right side of the reaction plate 74 is in a forward direction. As a result of the combined thrusts, the thrust vector 124 may spin the roaming vehicle 12 in a counter-clockwise direction.

Figure 9:
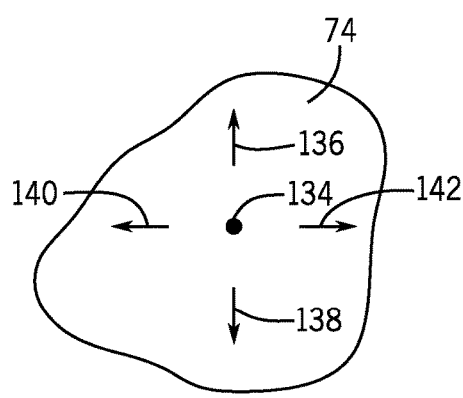

FIG. 9 is an overhead schematic illustrating SSLIMs 14 being controlled to produce balanced thrust towards the edges of the reaction plate 74 so there is no thrust vector (dot 134) applied to the reaction plate 74, thereby holding the roaming vehicle 12 in place, in accordance with an embodiment. In particular, one or more SSLIMs 14 underneath the front and back of the reaction plate 74 may thrust in opposite directions towards the edges of the reaction plate 74, as shown by arrow 136 representing thrust in a forward direction and arrow 138 representing thrust in a backward direction. In conjunction with the thrusts 136 and 138, one or more SSLIMs 14 underneath the left and right sides of the reaction plate 74 may thrust in opposite directions towards the edges of the reaction plate 74, as shown by arrow 140 representing thrust in a left direction and arrow 142 representing thrust in a right direction, to hold the reaction plate 74 in place. The thrusts 136, 138, 140, and 142 may produce a balanced pattern of thrusts from the SSLIMs 14 that do not result in a vectored force applied to the reaction plate 74.

Figure 10:
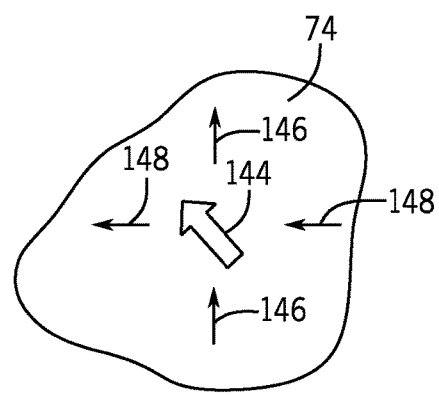

FIG. 10 is an overhead schematic illustrating SSLIMs 14 being controlled to produce a thrust vector (arrow 144) in a forward and left direction in the reaction plate 74, in accordance with an embodiment. The thrust vector 144 may be produced by one or more SSLIMs 14 underneath the front and back of the roaming vehicle 12 generating thrust (arrow 146) in a forward direction and one or more SSLIMs 14 underneath the left and right sides of the roaming vehicle 12 generating thrust (arrow 148) in a left direction. The combined thrusts may generate a thrust vector that provides an angled direction (e.g., 45 degrees) of travel for the roaming vehicle 12.

Figure 11:
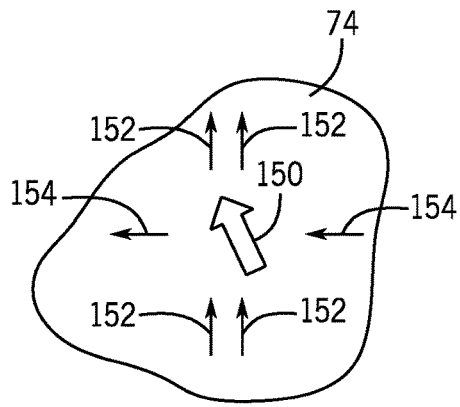

FIG. 11 is an overhead schematic illustrating SSLIMs 14 being controlled to produce a thrust vector (arrow 150) in a forward and slightly left direction in the reaction plate, in accordance with an embodiment. Compared to thrust vector 144 of FIG. 10, thrust vector 150 in FIG. 11 is angled left to a lesser degree as a result of activating more SSLIMs 14 underneath the front and back of the roaming vehicle 12 to generate more thrust (arrows 152) in the forward direction than SSLIMs 14 underneath the left and right sides generating thrust (arrows 154) in the left direction. That is, the resulting thrust vector 150 is directed more forward than to the left as a result of the thrust generated by the SSLIMs 14 underneath the front and back exceeding the thrust generated by the SSLIMs 14 underneath the left and right sides of the reaction plate 74. It should be understood that the angle of direction of the thrust vector may be finely tuned by activating appropriate SSLIMs 14.

Figure 12:
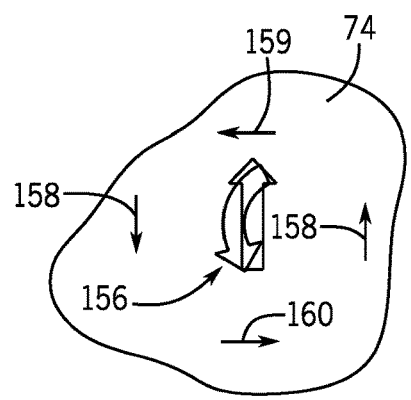

FIG. 12 is an overhead schematic illustrating SSLIMs 14 being controlled to produce a thrust vector (arrows 156) in a forward direction while rotating counter-clockwise in the reaction plate 74, in accordance with an embodiment. To generate the forward, counter-clockwise rotating thrust vector 156, one or more SSLIMs 14 underneath the right and left sides of the reaction plate 74 may generate thrust (arrows 158) in the forward direction and one or more SSLIMs 14 underneath the front and back of the reaction plate 74 may generate thrust (arrows 159 and 160) in opposite directions that are orthogonal to the direction of side thrusts 158. For example, thrust 159 is in a left direction and thrust 160 is in a right direction, which may cause the roaming vehicle 12 to spin counter-clockwise, while thrusts 158 cause the roaming vehicle 12 to move in a forward direction. It should be understood that the SSLIMs 14 may be controlled to spin the roaming vehicle 12 in a clockwise direction.

Figure 13:
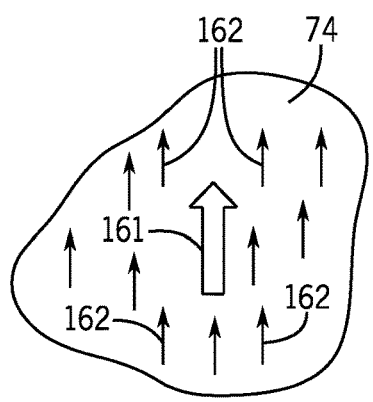

FIG. 13 is an overhead schematic illustrating SSLIMs 14 being controlled to produce a strong thrust vector (arrow 161) in a forward direction in the reaction plate 74 to increase acceleration, in accordance with an embodiment. As depicted, a higher density of SSLIMs 14 are activated and may generate thrusts (arrows 162) in a forward direction. The higher density of SSLIMs 14 activated in the same direction increase the thrust in that vector.

Figure 14:
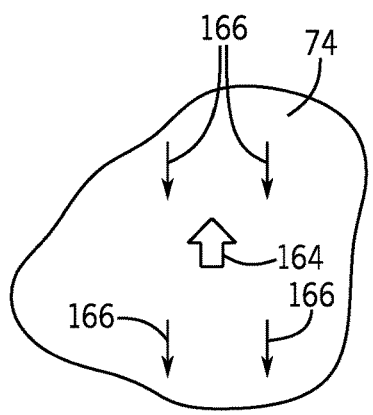

FIG. 14 is an overhead schematic illustrating SSLIMs 14 being controlled to produce a braking thrust vector (arrow 164) in a forward direction in the reaction plate 74, in accordance with an embodiment. The thrust vector arrow 164 is reduced in size to represent the effect of the braking thrust (arrows 166) being generated by SSLIMs 14 underneath the reaction plate 74 on the thrust vector 164 while the roaming vehicle 12 is in motion. It should be noted that, to slow down the roaming vehicle 12 moving in a particular direction, the SSLIMs 14 underneath the roaming vehicle 12 may be controlled to generate thrust (arrows 166) in an opposing direction to the direction of movement.

Figure 15:
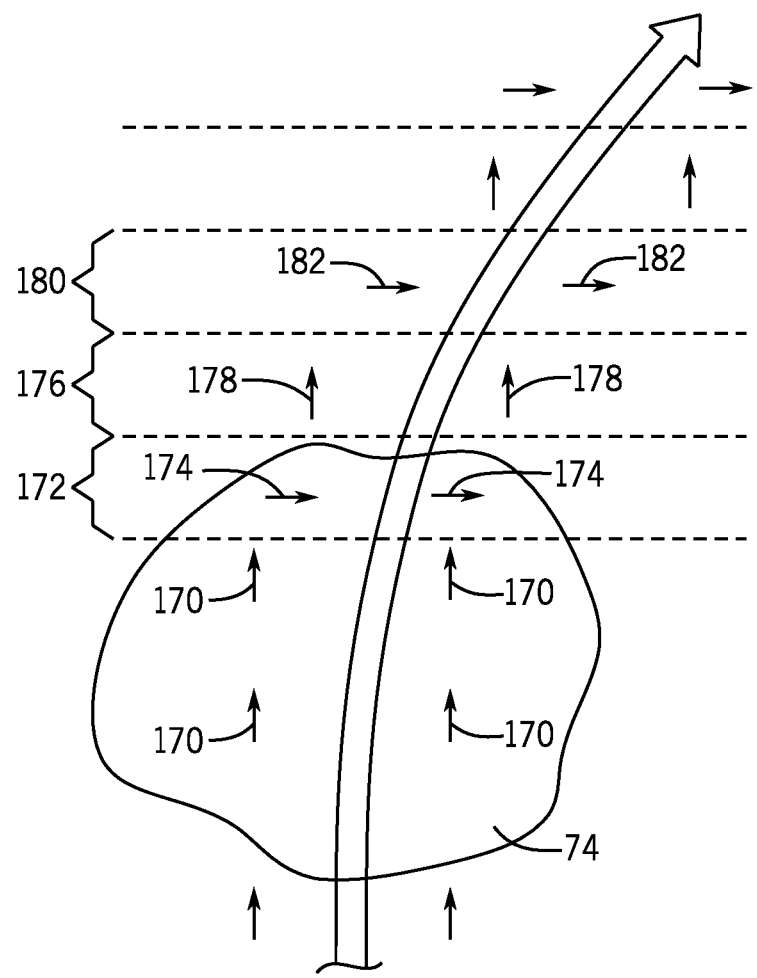

FIG. 15 is an overhead schematic illustrating SSLIMs 14 being controlled to produce a thrust vector (arrow 168) in the reaction plate 74 that curve the forward motion of the roaming vehicle 12 to the right without rotating the roaming vehicle 12, in accordance with an embodiment. Initially, the roaming vehicle 12 is traveling forward due to thrust (arrows 170) generated by SSLIMs 14 underneath the roaming vehicle 12. To curve the motion of the roaming vehicle 12, the control system 18 may determine the position of the roaming vehicle 12 and instruct the motor drive matrix 20 to activate SSLIMs 14 in the motion path of the roaming vehicle 12 in time to interact with the reaction plate 74 as the roaming vehicle 12 traverses the running surface to direct the roaming vehicle 12 in the desired direction. In some embodiments, as illustrated, various rows of SSLIMs 14 may produce thrust in the desired direction incrementally. For example, to curve the motion of the roaming vehicle 12 to the right, a first row 172 of SSLIMs 14 may generate thrust (arrows 174) in a right direction to force the vehicle 12 right in one increment. In the next increment, a second row 176 of SSLIMs 14 may generate thrust (arrows 178) in a forward direction to keep the roaming vehicle 12 moving forward. Then, in the next increment, a third row 180 of SSLIMs 14 may generate thrust (arrows 182) in the right direction to force the roaming vehicle 12 to the right. The control system 18 may control additional SSLIMs 14 in the motion path of the roaming vehicle 12 to continue to produce the curved motion by producing a sum thrust vector directed in any desired angle.

Figure 16:
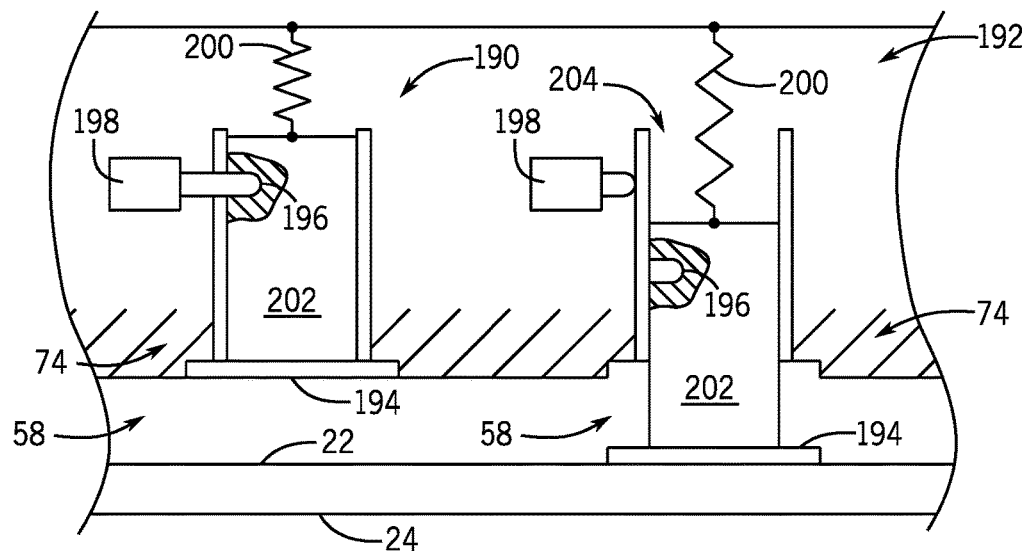
FIG. 16 is a cross-sectional side view of a mechanical brake included in the roaming vehicle, in accordance with an embodiment of the present disclosure.

FIG. 16 is a side view of the mechanical brake 58 included in the roaming vehicle 12, in accordance with an embodiment. In a first view, the mechanical brake 58 is shown as undeployed, and, in a second view 192, the mechanical brake 58 is show as deployed. In some embodiments, the mechanical brake 58 may include a ferrous plate 194 (e.g., steel) with a brake pad material for high frictional μ. The brake pad material may provide sufficient friction to hold the mechanical brake 58 and roaming vehicle 12 in place when in contact with the running surface 22. Further, the mechanical brake 58 may include a recess 196 in which a locking pin 198 is inserted to hold the mechanical brake 58 in the undeployed position as the mechanical brake 58 passes through magnetic fields generated by the SSLIMs 14 on the surface stator matrix 24. To deploy the mechanical brake 58, the control system 18 may send a control signal to the roaming vehicle 12 to release the locking pin 198. The magnetic field generated by the SSLIMs 14 may attract the ferrous plate 194 of the mechanical brake 58, which may cause the ferrous plate 194 to be pulled towards and contact the running surface 22 of the surface stator matrix 24, as shown in view 192.

In some embodiments, certain planned areas of the surface stator matrix 24 may provide a balanced (e.g., not applying a vectored force on the reaction plate 74) pattern of magnetic fields that activate deployment of the mechanical brake 58. In some embodiments, the mechanical brake 58 may be deployed when the magnetic field generated by the SSLIMs 14 is strong enough to overcome the force of the locking pin 198 holding the mechanical brake 58 in the undeployed position. It should be noted that the use of the mechanical brake 58 may be planned for certain portions of the roaming vehicle 12 motion profile or its use may be unplanned (e.g., in the case of an unexpected event). In some embodiments, the efficiency of the holding force used by the mechanical brake 58 may be small enough that the presence of a relatively low electromotive force threshold can be planned as an idle current allowing for a near minimum number of SSLIMs 14 to remain active for a minimum motion profile to motivate the mechanical brake 58.

To retract the mechanical break, a spring return 200 attached to a base 202 of the mechanical brake 58 may pull the mechanical brake 58 back into slot 204 when the magnetic field (e.g., electromotive force) attracting the ferrous plate 194 is reduced (e.g., not strong enough to overcome the pulling force of the spring return 200) or turned off. When retracted, the mechanical brake 58 may be locked into the undeployed position by the locking pin 198 being reinserted into the recess 196.

Figure 17:
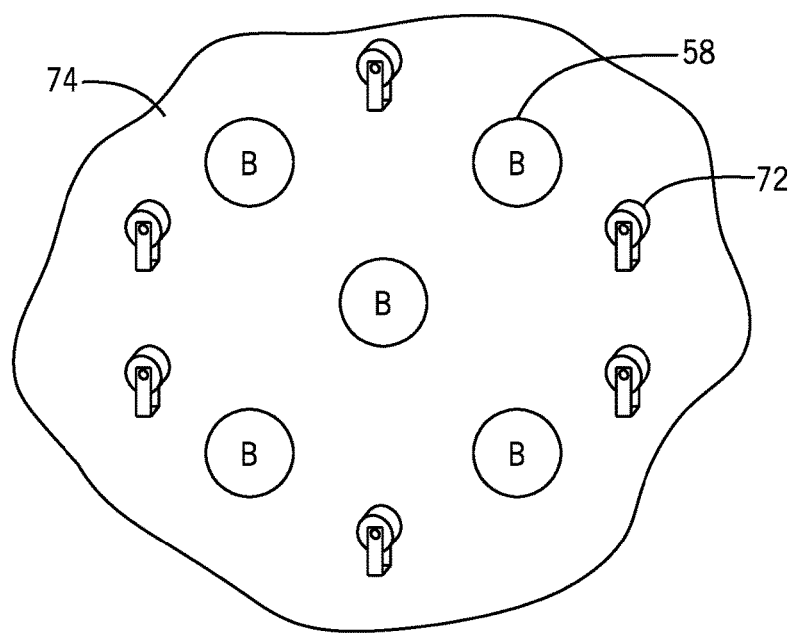
FIG. 17 is an overhead schematic representing an example arrangement of mechanical brake and caster locations in a reaction plate of the roaming vehicle, in accordance with an embodiment of the present disclosure.

There may be more than one mechanical brake 58 used by a roaming vehicle 12, and they may be arranged relative to the casters 72. For example, FIG. 17 is an overhead schematic of a number of mechanical brake 58 and caster 72 locations in the reaction plate 74 of the roaming vehicle 12, in accordance with an embodiment. It should be understood that the size and/or number of the mechanical brakes 58 may be determined based on the planned mass for the roaming vehicle 12 (e.g., planned mass of vehicle components and occupying patrons) and the velocity of the roaming vehicle 12. In some embodiments, the number and/or size of the mechanical brakes 58 may be determined based on the highest planned velocity for a roaming vehicle motion profile and a largest planned mass for the roaming vehicle 12. This may enable providing sufficient holding force when the mechanical brakes 58 are deployed to handle upper-bound scenarios. Further, in some embodiments, when the roaming vehicle 12 is traveling at lesser than the highest planned velocity, not all of the mechanical brakes 58 may be deployed. That is, the number of mechanical brakes 58 that are deployed may depend on how much holding force is needed to stop the roaming vehicle 12 based on the velocity and mass of the roaming vehicle 12. In the depicted embodiment, five mechanical brakes 58 are included in the reaction plate 74 of the roaming vehicle 12. One mechanical brake 58 is located in each of four corners of the reaction plate 74 and one mechanical brake 58 is located in the center of the reaction plate 74. It should be understood that any suitable number of mechanical brakes 58 may be used.

The number of casters 72 and the location of the casters 72 at each point on the reaction plate 74 may vary as desired to maintain a sufficient air gap between the reaction plate 74 and the SSLIMs 14. For example, if the reaction plate 74 does not include casters 72 at certain portions of the reaction plate 74, those portions may wobble (e.g., move up and down) while the roaming vehicle 12 traverses the surface stator matrix 24. The up and down movement of the portions of the reaction plate 74 may vary the distance of the air gap and reduce efficiency of the SSLIMs 14. Also, the size of the casters 72 may be reduced to enable a relatively minor air gap between the reaction plate 74 and the SSLIMs 14. As depicted, the reaction plate 74 includes six casters 72: two on the left and right sides of the reaction plate 74, one on the front of the reaction plate 74, and one on the back of the reaction plate 74. Such an arrangement may inhibit up and down movement of the reaction plate 74 as the roaming vehicle 12 traverses the surface stator matrix 24 to maintain a precise air gap. It should be understood that any suitable number, size, and/or location of the casters 72 may be used to maintain the precise air gap.

FIGS. 18-21 are flow diagrams of various processes for braking or holding the roaming vehicle 12 and/or releasing the roaming vehicle 12. Although the following description of the processes in FIGS. 18-21 are described as being performed by the control system 18, it should be noted that some or all of the processes may be performed by other control devices that may be capable of communicating with the control system 18, the position monitoring system 16, and/or the motor drive matrix 20, such as a the roaming vehicle 12, computing device, or other component associated with the propulsion system 10. Additionally, although the following processes describe a number of operations that may be performed, it should be noted that the processes may be performed in different orders and that certain operations may not be performed. The processes may be implemented as computer instructions stored on the memory 32 of the control system 18.

Figure 18:
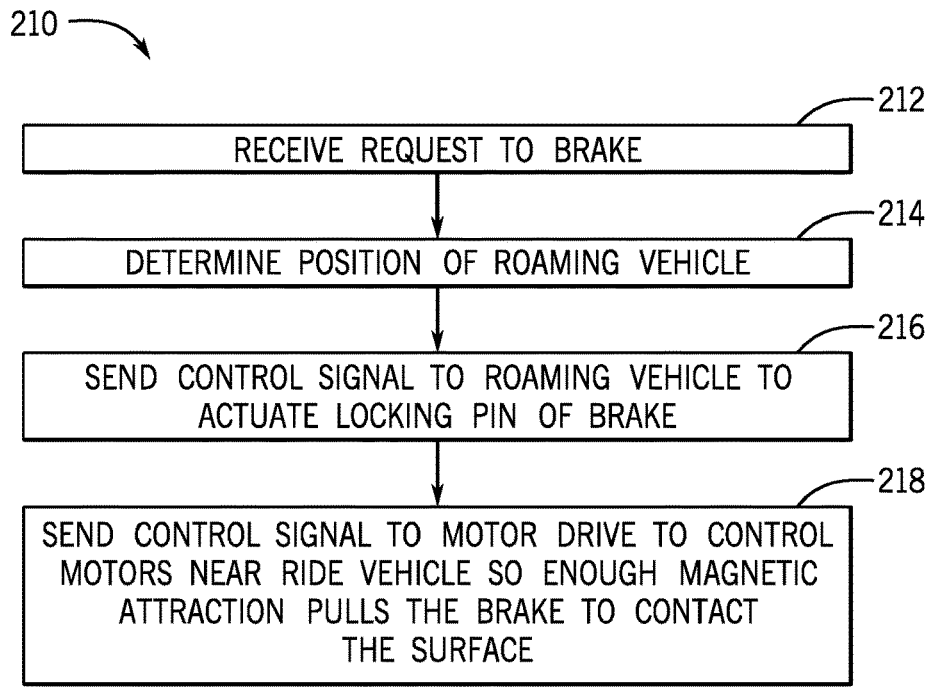
FIG. 18 is a flow diagram of a process for deploying the mechanical brake of FIG. 16, in accordance with an embodiment of the present disclosure.

With the foregoing in mind, FIG. 18 is a flow diagram of a process 210 for deploying the mechanical brake 58 of FIG. 16, in accordance with an embodiment. The control system 18 may receive (212) a request to brake. The request to brake may be received from the roaming vehicle 12 (e.g., based on user input), may be received as part of the motion profile obtained from the memory 32, or the like.

The control system 18 may determine (block 214) the position of the roaming vehicle 12 using vehicle information from the position monitoring system 16 or from the position tracking system 70. That is, the control system 18 may determine the position of the roaming vehicle 12 relative to the surface stator matrix 24 based on the vehicle information received.

The control system 18 may send (block 216) a control signal to the roaming vehicle 12 to actuate (e.g., retract) the locking pin 198 of one or more mechanical brakes 58. The control system 18 may also send (218) a control signal to the appropriate motor drives 48 and/or switching panel 50 to control the SSLIMs 14 near the roaming vehicle 12 to provide a magnetic field with sufficient strength to pull the ferrous material of the one or more mechanical brakes 58 to contact the surface of the running surface 22. The holding force of the one or more deployed mechanical brakes 58 may cause the roaming vehicle 12 to stop moving.

Figure 19:
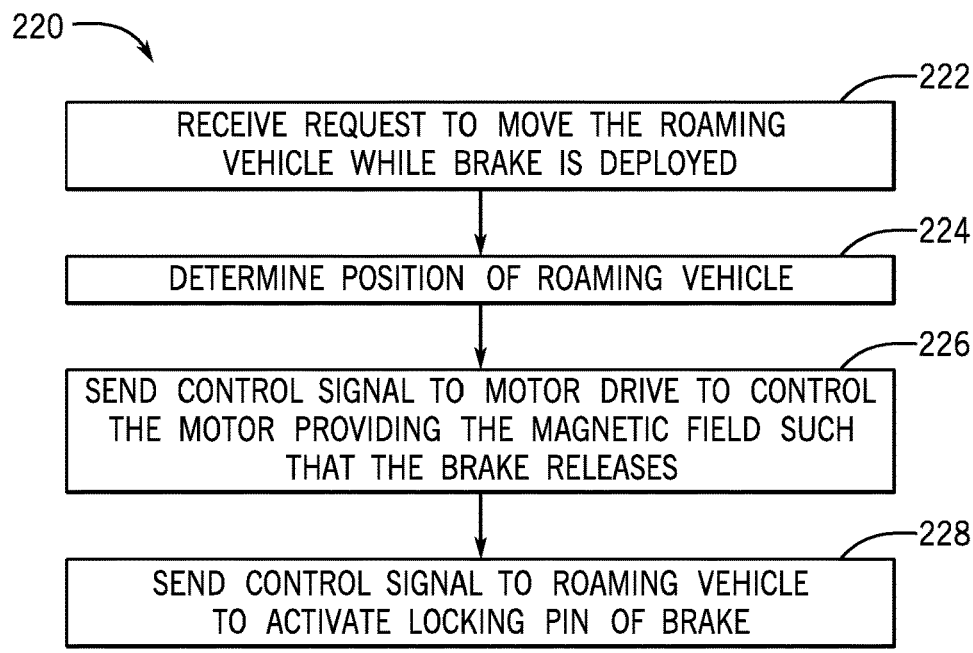
FIG. 19 is a flow diagram of a process for retracting the mechanical brake of FIG. 16, in accordance with an embodiment of the present disclosure.

FIG. 19 is a flow diagram of a process 220 for retracting the mechanical brake 58 of FIG. 16, in accordance with an embodiment. The control system 18 may receive (block 222) a request to move the roaming vehicle 12 while one or more mechanical brakes 58 are deployed. The request may be received from the roaming vehicle 12 (e.g., based on user input), may be received as part of the motion profile obtained from the memory 32, or the like.

The control system 18 may determine (block 224) the position of the roaming vehicle 12 using vehicle information from the position monitoring system 16 or from the position tracking system 70. That is, the control system 18 may determine the position of the roaming vehicle 12 relative to the surface stator matrix 24 based on the vehicle information received.

The control system 18 may send (block 226) a control signal to appropriate motor drives 48 and/or switching panel 50 to control the SSLIMs 14 providing the magnetic field attracting the mechanical brake 58 such that the brake 58 retracts. That is, the magnetic field generated by the SSLIMs 14 may be reduced to an insufficient strength to overcome the force of the spring return 200, thereby enabling the spring return 200 to pull the mechanical brake 58 away from the SSLIMs 14 into slot 204 for storage. Once the mechanical brake 58 is retracted into slot 204, the control system 18 may send a control signal to the roaming vehicle 12 to actuate (e.g., deploy) the locking pin 198 into recess 196 to secure the mechanical brake 58 in the undeployed position.

Figure 20:
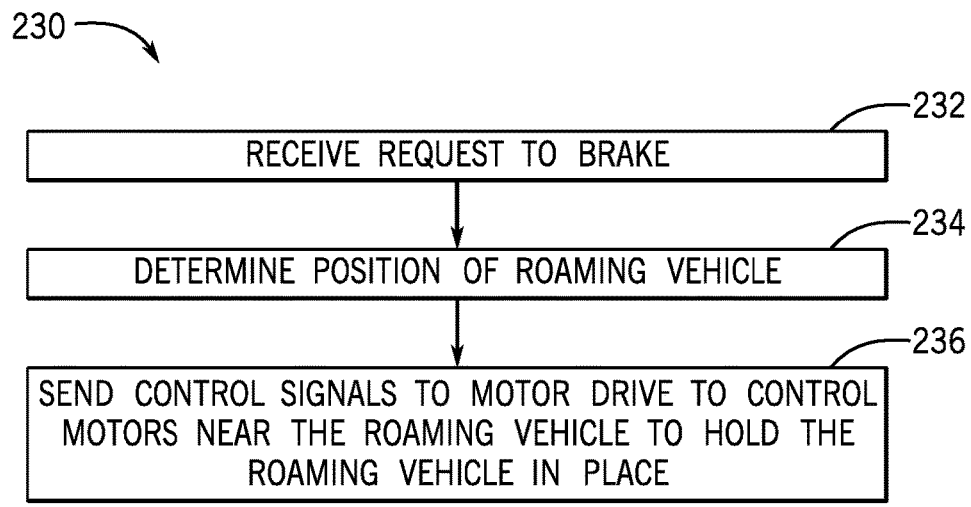
FIG. 20 is a flow diagram of a process for applying magnetic force using the SSLIMs to hold the roaming vehicle in place, in accordance with an embodiment of the present disclosure.

FIG. 20 is a flow diagram of a process 230 for applying magnetic force using the SSLIMs 14 to hold the roaming vehicle 12 in place, in accordance with an embodiment. The control system 18 may receive (block 232) a request to slow down or stop the roaming vehicle 12. The request may be received from the roaming vehicle 12 (e.g., based on user input), may be received as part of the motion profile obtained from the memory 32, or the like.

The control system 18 may determine (block 234) the position of the roaming vehicle 12 using vehicle information from the position monitoring system 16 or from the position tracking system 70. That is, the control system 18 may determine the position of the roaming vehicle 12 relative to the surface stator matrix 24 based on the vehicle information received.

The control system 18 may send (block 236) control signals to the appropriate motor drives 48 and/or switching panel 50 to control the SSLIMs 14 near the roaming vehicle 12 (e.g., underneath and/or around the location of the roaming vehicle 12) to hold the roaming vehicle 12 in place. In some embodiments, one SSLIM 14 underneath the front, back, left side, and right side of the reaction plate 74 may generate near equal and balanced thrust towards the center of the reaction plate 74. As a result, no thrust vector may be generated and the roaming vehicle 12 may be held in a stationary position. As discussed above, a similar scenario may occur when the SSLIMs 14 on equivalent positions on opposite sides of the reaction plate 74 thrust towards the outer edges of the reaction plate 74.

Figure 21:
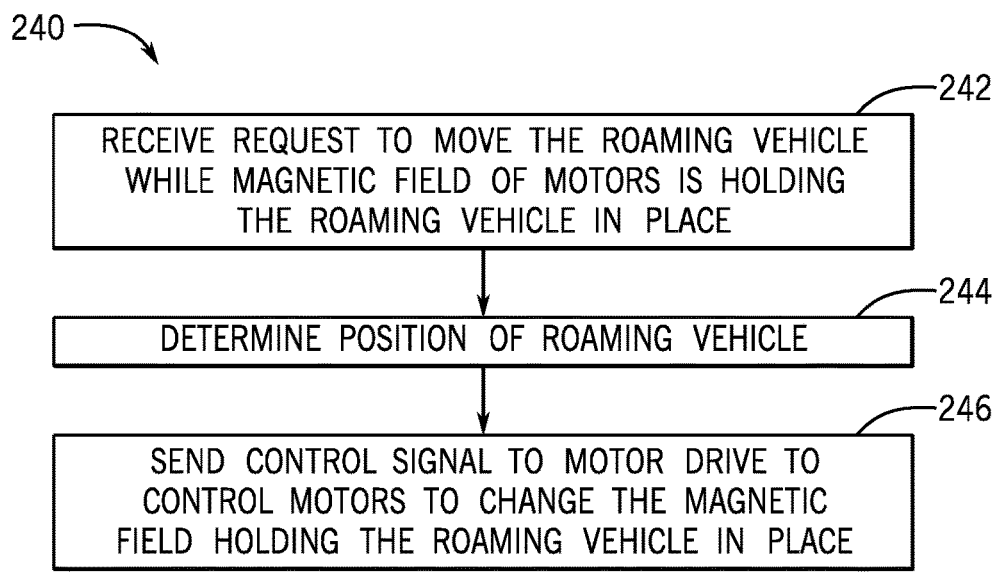
FIG. 21 is a flow diagram of a process for releasing the holding magnetic force using the SSLIMs to enable the roaming vehicle to move, in accordance with an embodiment of the present disclosure.

FIG. 21 is a flow diagram of a process 240 for releasing the holding magnetic force using the SSLIMs 14 to enable the roaming vehicle 12 to move, in accordance with an embodiment. The control system 18 may receive (block 242) a request to move the roaming vehicle 12 while the magnetic field of the SSLIMs 14 is holding the roaming vehicle 12 in place. The request may be received from the roaming vehicle 12 (e.g., based on user input), may be received as part of the motion profile obtained from the memory 32, or the like.

The control system 18 may determine (block 244) the position of the roaming vehicle 12 using vehicle information from the position monitoring system 16 or from the position tracking system 70. That is, the control system 18 may determine the position of the roaming vehicle 12 relative to the surface stator matrix 24 based on the vehicle information received.

The control system 18 may send (block 246) control signals to the appropriate motor drives 48 and/or switching panel 50 to control the SSLIMs 14 holding the roaming vehicle 12 in place to change or remove the magnetic field to enable the roaming vehicle 12 to move. For example, the control system 18 may change the thrust vector generated by the SSLIMs 14 by commanding that one or more SSLIMs underneath the reaction plate 74 to generate thrust in the reaction plate 74 in a forward direction. As a result of the changed thrust vector, the roaming vehicle 12 may be released from the stationary position and be motivated in the direction of the thrust vector.

Figure 22:
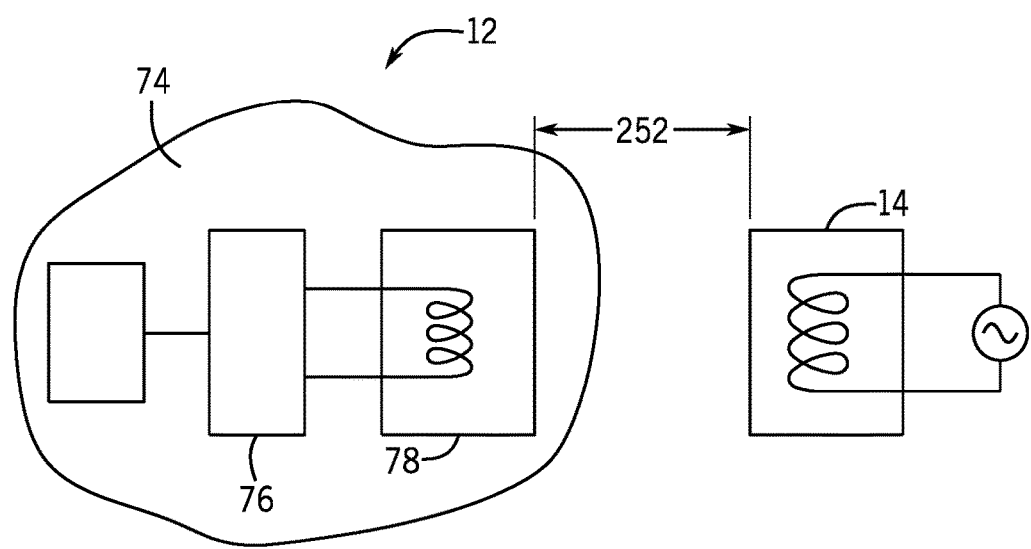
FIG. 22 is a schematic diagram illustrating using an induction coil to pick up energy to power onboard electronics of the roaming vehicle, in accordance with an embodiment of the present disclosure.

As previously discussed, the magnetic field generated by the SSLIMs 14 may be harnessed to power onboard electronics of the roaming vehicle 12. To that end, FIG. 22 is a schematic diagram illustrating using an induction coil 79 on the reaction plate 74 to pick up energy from the SSLIM 14 to power the onboard electronics (e.g., processor 52, memory 54, communication module 56, power supply 60, wireless directional controller 62, speakers 64, lights 66, restraint locks 68, position tracking system 70) of the roaming vehicle 12, in accordance with an embodiment. As depicted, one or more rectifiers and/or power conditioners 76 may be used to convert, condition, amplify, or some combination thereof, the inducted energy from the magnetic field generated by the SSLIM 14. For example, the rectifier may 78 may convert the AC power to DC power that is used to power the onboard electronics. In some embodiments, the size of an air gap 252 between the reaction plate 74 and the SSLIM 14 may affect the strength of the induction field generated by the SSLIM 14 and the amount of energy picked up by the induction coil 79. Thus, it may be desirable to maintain a relatively small air gap 252 to enhance the induction field.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A propulsion system, comprising:
   one or more roaming vehicles comprising a reaction plate installed on a bottom of each of the one or more roaming vehicles;
   a surface stator matrix installed with a running surface for the one or more roaming vehicles and comprising a plurality of single sided linear induction motors (SSLIMs), wherein each of at least a portion of the plurality of SSLIMs include two windings installed orthogonally to one another;
   a plurality of motor drives configured to electrically couple to the plurality of SSLIMs via a switching panel; and
   a control system configured to:
      receive information related to the one or more roaming vehicles;
      receive a desired motion profile for the one or more roaming vehicles across the surface stator matrix;
      determine which of the plurality of SSLIMs to activate and a performance of the plurality of SSLIMs based on the desired motion profile, the information, or some combination thereof; and
      send control signals to the plurality of motor drives to control the plurality of SSLIMs to produce the desired motion profile, wherein the plurality of motor drives is configured to control the plurality of SSLIMs to produce the desired motion profile by activating a subset of the plurality of SSLIMs underneath the reaction plate in time to generate a thrust vector in the reaction plate that causes the one or more roaming vehicles to follow a path specified by the desired motion profile as the one or more roaming vehicles traverse the running surface.

2. The propulsion system of claim 1, wherein:
   the plurality of motor drives are of a lesser quantity than the plurality of SSLIMs; and
   the control system multiplexes the plurality of motor drives via the switching panel to control the subset of the plurality of SSLIMs for providing the desired motion profile of the one or more roaming vehicles.

3. The propulsion system of claim 1, wherein the one or more roaming vehicles comprise a mechanical brake comprising a ferrous plate and a braking material, wherein a magnetic field generated by one or more of the plurality of SSLIMs attracts the ferrous plate to the running surface and the braking material provides friction to stop the one or more roaming vehicles.

4. The propulsion system of claim 1, wherein a first of the two windings is arranged in a longitudinal direction and a second of the two windings is arranged in a lateral direction in the portion of the plurality of SSLIMs.

5. The propulsion system of claim 4, wherein the two windings are encased in a respective slat of an epoxy tile block that forms the portion of the plurality of SSLIMs and a sheet of vinyl is disposed on a top of the epoxy tile block that serves as the running surface for casters of the one or more roaming vehicles.

6. The propulsion system of claim 1, comprising a position monitoring system configured to determine the information including at least a position of the one or more roaming vehicles, a velocity of the one or more roaming vehicles, or both.

7. The propulsion system of claim 6, wherein the position monitoring system comprises:
an optic system that uses a camera to track the information, wherein the optic system is separate from the one or more roaming vehicles;
a processor that uses signal triangulation to triangulate a signal from the one or more roaming vehicles through a network to which the position monitoring system and the one or more roaming vehicles are connected to determine the information; or
both the optic system and the processor.

8. The propulsion system of claim 1, wherein each of the two windings are individually energizeable to produce a magnetic field in one of two directions based on polarity.

9. The propulsion system of claim 1, wherein the one or more roaming vehicles comprises onboard electronics that are powered at least in part on power inducted from magnetic fields generated by the plurality of SSLIMs.

10. The propulsion system of claim 1, wherein a number of SSLIMs of the plurality SSLIMs to activate and an amount of current to supply to the activated SSLIMs of the plurality of SSLIMs is determined based on a velocity and a path included in the desired motion profile.

11. The propulsion system of claim 1, wherein the desired motion profile is obtained as user input from the one or more roaming vehicles, as a preconfigured motion profile from a memory of the control system, or some combination thereof.

12. A method, comprising:
receiving, via a control system, information related to one or more roaming vehicles disposed on a running surface of a surface stator matrix, wherein the surface stator matrix comprises a plurality of single sided linear induction motors (SSLIMs), each SSLIM of the plurality of SSLIMs including two windings arranged orthogonal to each other, and the one or more roaming vehicles comprise a non-ferrous reaction plate attached to a bottom of each respective roaming vehicle of the one or more roaming vehicles;
receiving, via the control system, a desired motion profile for the one or more roaming vehicles across the surface stator matrix;
determining, via the control system, a selection of the plurality of SSLIMs to activate and a performance of the selection of the plurality of SSLIMs based on the desired motion profile, the information, or some combination thereof; and
sending, via the control system, control signals to the plurality of motor drives to control the selection of the plurality of SSLIMs to produce the desired motion profile, wherein the plurality of motor drives controls the plurality of SSLIMs to produce the desired motion profile by activating a subset of the plurality of SSLIMs underneath the reaction plate in time to generate a thrust vector in the reaction plate that causes the one or more roaming vehicles to follow a path specified by the desired motion profile as the one or more roaming vehicles traverse the running surface.

13. The method of claim 12, comprising multiplexing the plurality of motor drives to control only the subset of the plurality of SSLIMs needed for the desired motion profile of the one or more roaming vehicles, wherein the plurality of motor drives are of a lesser quantity than the plurality of SSLIMs.

14. The method of claim 12, comprising sending, via the control system, control signals to one or more of the plurality of motor drives to control one or more of the plurality of SSLIMs near the one or more roaming vehicles to generate a magnetic field that attracts a ferrous plate of a mechanical brake included in each of the one or more roaming vehicles to contact a surface of the surface stator matrix.

15. The method of claim 12, wherein the information related to the one or more roaming vehicles comprises a position, a velocity, or both, of the one or more roaming vehicles, and the information is received from a position monitoring system.

16. The method of claim 12, wherein the performance of the selection of the plurality of SSLIMs comprises timings of activation for each of the plurality of SSLIMs used to produce the desired motion profile, a magnitude of magnetic field to generate, or some combination thereof.

17. A propulsion system, comprising:
a control system that:
receives information related to one or more roaming vehicles disposed on a running surface of a surface stator matrix, wherein the surface stator matrix comprises a plurality of single sided linear induction motors (SSLIMs), each SSLIM of the plurality of SSLIMs including two windings arranged orthogonal to each other, and the one or more roaming vehicles comprise a non-ferrous reaction plate attached to a bottom of each respective roaming vehicle of the one or more roaming vehicles;
receives a desired motion profile for the one or more roaming vehicles across the surface stator matrix;
determines which of the plurality of SSLIMs to activate and a performance of the plurality of SSLIMs based on the desired motion profile, the information, or some combination thereof; and
sends control signals to a plurality of motor drives to control the plurality of SSLIMs to produce the desired motion profile, such that the plurality of motor drives controls the plurality of SSLIMs to produce the desired motion profile by activating a subset of the plurality of SSLIMs underneath the reaction plate in time to generate a thrust vector in the reaction plate that causes the one or more roaming vehicles to follow a path specified by the desired motion profile as the one or more roaming vehicles traverse the running surface.

18. The control system of claim 17, wherein the control system multiplexes the plurality of motor drives to control only the subset of the plurality of SSLIMs needed for the desired motion profile of the one or more roaming vehicles, wherein the plurality of motor drives are of a lesser quantity than the plurality of SSLIMs.

19. The control system of claim 17, wherein the control system detects abnormal operation of certain windings of the plurality of SSLIMS using closed-loop feedback and back calculation of the one or more roaming vehicles resultant motion.

* * * * *